US012771627B2

(12) United States Patent
Song et al.

(10) Patent No.: US 12,771,627 B2
(45) Date of Patent: Oct. 20, 2026

(54) METHOD AND APPARATUS FOR DETERMINING NETWORK CHANNEL STATUS OF TACTICAL DATA LINK USING AHP-TOPSIS

(71) Applicant: AGENCY FOR DEFENSE DEVELOPMENT, Daejeon (KR)

(72) Inventors: Daeyoung Song, Daejeon (KR); Younghoon Goo, Daejeon (KR); Heonjei Park, Daejeon (KR); Sinuk Choi, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 70 days.

(21) Appl. No.: 18/966,675

(22) Filed: Dec. 3, 2024

(65) Prior Publication Data

US 2026/0081853 A1 Mar. 19, 2026

(30) Foreign Application Priority Data

Sep. 13, 2024 (KR) ........................ 10-2024-0125408

(51) Int. Cl.
*H04L 43/08* (2022.01)
*H04L 67/12* (2022.01)

(52) U.S. Cl.
CPC .............. *H04L 43/08* (2013.01); *H04L 67/12* (2013.01)

(58) Field of Classification Search
CPC ...... H04L 43/08; H04L 67/12; H04L 43/0888
See application file for complete search history.

(56) References Cited

U.S. PATENT DOCUMENTS

| | | | | |
|---|---|---|---|---|
| 8,472,323 | B2 * | 6/2013 | Kallio | H04L 65/104 370/235 |
| 9,807,010 | B2 * | 10/2017 | Luciani | H04L 43/50 |
| 10,004,082 | B2 * | 6/2018 | Bane | H04W 72/56 |

FOREIGN PATENT DOCUMENTS

| | | | | |
|---|---|---|---|---|
| CN | 104318482 A | * 1/2015 | | G06Q 50/06 |
| CN | 112436868 B | * 11/2022 | | H04W 24/08 |

* cited by examiner

*Primary Examiner* — Lesa M Kennedy
(74) *Attorney, Agent, or Firm* — Studebaker Brackett PLLC

(57) ABSTRACT

Disclosed are a method and apparatus for determining a network channel status of a tactical data link. The method performed by the network channel status determining apparatus includes: defining indicators for network terminal channel status; setting weights for higher-level indicators and lower-level indicators, out of the indicators; calculating a combined weight for each lower-level indicator; setting criteria for lower-level indicator values of a reference channel; receiving the lower-level indicator values; and calculating higher-level indicator values and determining top-level indicator channel status.

11 Claims, 5 Drawing Sheets

METHOD AND APPARATUS FOR DETERMINING NETWORK CHANNEL STATUS OF TACTICAL DATA LINK USING AHP-TOPSIS

CROSS-REFERENCE TO RELATED APPLICATIONS

This application claims benefit of priority to Korean Patent Application No. 10-2024-0125408 filed Sep. 13, 2024, the entire content of which is incorporated herein by reference.

TECHNICAL FIELD

The present disclosure relates to a method and apparatus for determining a network channel status of a tactical data link using AHP-TOPSIS, and more particularly, to a method and apparatus for comprehensively expressing channel status without intervention from a network manager, rather than a method in which a number of indicators representing channel status are listed and an administrator determines a comprehensive status based on the indicators, as in tactical data links currently in operation.

BACKGROUND

A network structure of a tactical data link varies frequently depending on the variability of the situation in a battlefield. Nodes participating in an operation vary frequently depending on the concept of the operation being pursued, and, due to this, the number of tracks detected by a tactical data link, the amount of tactical information being circulated, and the communication environment also are fluid. In a case where a congestion occurs due to limited availability of network resources, the operation will be conducted in a poor network environment, such as when there is no line-of-sight (LOS) due to the presence of an obstacle or when network connection quality is deteriorated as the nodes participating in the operation move at high speed. In such cases, tactical information cannot be received at the right time, and errors may occur during message processing as a message circulated during network operation is lost or a received message packet is destroyed. Accordingly, it is necessary to manage the network at the right time by monitoring and analyzing a network channel status of a tactical data link in real time.

Network channel indicators mean indicators for measuring the status and performance of a network. A network manager analyzes collected network status indicators according to a designed network architecture and determines the status of the network from the analyzed indicators.

To help understanding of the disclosure, a method for determining a network channel status of a Korean joint tactical data link (Link-K) will be described. Currently, the Republic of Korea Armed Forces use Link-K tactical data links which they developed to enable more prompt, accurate, and effective joint operations by the Army, Navy, and Air Forces. The Link-K tactical data links allow real-time sharing and propagation of tactical information encrypted between various weapons systems for land, sea, and air in order to rapidly share tactical situation information such as location data or armament of our forces and enemy forces.

In Link-K tactical data links, network status is monitored in real time by using network management system software (NMSS) within a node. Since Link-K tactical data links currently only collect channel status indicators for the amounts of network resources allocated and used per channel and for general connection quality, it is necessary to bring together and analyze all indicators affecting channel status in order to accurately determine the channel status of a tactical data link.

Besides, in advanced tactical data link systems including Link-16, various network status indicators are collected; still, the network manager has to intervene in order to determine a comprehensive channel status.

The above-described background art is technical information that the present inventors possessed for derivation of the present disclosure or acquired during the derivation process of the present disclosure, and cannot necessarily be said to be known to the general public prior to filing the present disclosure.

SUMMARY

An aspect to be accomplished by certain embodiments of the present invention is to provide a method and apparatus for comprehensively expressing channel status without intervention from a network manager, rather than a method in which a number of indicators representing channel status are listed and an administrator determines a comprehensive status based on the indicators, as in tactical data links currently in operation, and the method is required to meet the following three requirements. First, an assessment cannot be done based on a single criterion since there are many factors affecting channel status, and therefore it is necessary to produce a single value by receiving a number of factors in various criteria as input. Second, outcomes need to be produced automatically without intervention from an expert or a network manager. Third, outcomes can be obtained just by inputting information on current channel status. The present disclosure is directed to addressing these challenges.

An exemplary embodiment of the present disclosure provides a method for determining a network channel status of a tactical data link using AHP-TOPSIS, performed by a network channel status determining apparatus, the method including: defining indicators for network terminal channel status; setting weights for higher-level indicators and lower-level indicators, out of the indicators; calculating a combined weight for each lower-level indicator; setting criteria for lower-level indicator values of a reference channel; receiving the lower-level indicator values; and calculating higher-level indicator values and determining top-level indicator channel status.

The higher-level indicators may include node status, congestion state, and connection quality.

The lower-level indicators may include C2/NonC2, number of controlling units in C2, and number of nodes connected to channel.

The lower-level indicators may include channel utilization, amount left in transmission queue, and transmission success rate.

The lower-level indicators may include quality of connection between two nodes, round-trip time for message transmission and reception, and reception delay time.

The channel status may be classified into four categories.

According to the above-described exemplary embodiment of the present disclosure, various channel properties of a tactical data link network can be brought together to indicate channel status in real time without intervention from a network manager. Therefore, it is possible to promptly address tactical data link network issues such as channel congestion, deterioration in connection quality, etc. from network structure changes caused by physical and spatial variability of the situation in a battlefield. This allows for stable network operation by promptly coping with variable battlefield situations.

DETAILED DESCRIPTION

Figure 1:
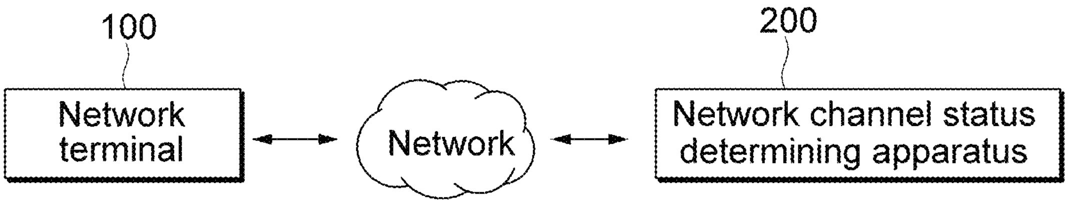
FIG. 1 illustrates an exemplary environment to which a network channel status determining apparatus according to some embodiments of the present disclosure can be applied.

Hereinafter, exemplary embodiments of the present disclosure will be described in detail with reference to the accompanying drawings. Advantages and features of the present disclosure and a method for achieving them will be made clear from the embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the present disclosure to those skilled in the art. The present disclosure is merely defined by the scope of the claims.

It should be noted that in assigning reference numerals to the components of each drawing, the same components have the same numerals as much as possible even when they are shown in different drawings. In addition, in describing the present disclosure, when it is determined that a detailed description of a related known configuration or function may obscure the gist of the present disclosure, the detailed description will be omitted.

Unless otherwise defined, all terms (including technical and scientific terms) used in the present specification may be used in a meaning that is commonly understood by those skilled in the art to which the present disclosure pertains. In addition, terms defined in commonly used dictionaries are not interpreted ideally or excessively unless specifically defined explicitly. The terms used herein are for describing the embodiments and are not intended to limit the present disclosure. In the present specification, the singular also includes the plural unless specifically stated in the phrase.

In addition, terms such as first, second, A, B, (a), and (b) may be used in describing the components of the present disclosure. These terms are only used to distinguish one component from another, and the nature, sequence, or order of the corresponding component is not limited by the term. When a component is described as being "linked," "coupled," or "connected" to another component, the corresponding component may be directly linked or connected to another component, but it should be understood that another component may be "linked", "coupled" or "connected" between the components.

In the present specification, expressions such as "comprise(s) (comprising)" and/or "include(s) (including)" indicate the existence of the mentioned component, step, operation and/or element, and do not preclude the presence or addition of one or more other components, steps, operations and/or elements.

Hereinafter, various embodiments of the present disclosure will be described in detail with reference to the accompanying drawings.

Further, terms such as first, second, A, B, (a), and (b) may be used in describing the components of the present disclosure. These terms are only used to distinguish one component from another, and the nature, sequence, or order of the corresponding component is not limited by the term. Throughout the present specification, when a part "comprise" or "include" a certain component, it means that the part may further include other components without excluding other components unless otherwise stated. Furthermore, terms such as "unit" and "module" described in the present specification refer to a unit that processes at least one function or operation, and may be implemented by hardware or software, or a combination of hardware and software.

FIG. 1 illustrates an exemplary environment to which a network channel status determining apparatus according to some embodiments of the present disclosure can be applied. An operation of determining a top-level indicator (channel status) of a tactical data link may be performed through a system including a network terminal 100 and a network channel status determining apparatus 200 which are depicted in FIG. 1. In what follows, the components depicted in FIG. 1 related to the channel status determining operation using the network terminal 100 and the channel status determining apparatus 200 will be described more concretely with respect to the above-mentioned system.

Although FIG. 1 illustrates an example in which the network terminal 100 and the network channel status determining apparatus 200 are connected via a network, this is just for ease of explanation and the number of devices that can be connected to the network may vary.

Moreover, while FIG. 1 illustrates an example in which the network terminal 100 and the network channel status determining apparatus 200 are connected via a network, it should be noted that the network terminal 100 and the network channel status determining apparatus 200 may be connected via any physical means to which an electronic device can be connected.

On the other hand, FIG. 1 merely illustrates an exemplary embodiment for accomplishing aspects of the present disclosure, some components may be added or removed as necessary. Hereinafter, the components depicted in FIG. 1 will be described in more specific detail.

The network channel status determining apparatus 200 may collect and analyze various information generated from the network terminal 100. The various information may include all data generated from the network terminal 100. For example, the various information may mean data on the node status, congestion state, and connection quality of the network terminal 100. The above data may be obtained through all electronic devices the network terminal 100 has, and the data may be transmitted to the network channel status determining apparatus 200.

The network terminal 100 depicted in FIG. 1 means a network terminal corresponding to a network structure of a tactical data link, and may correspond to a node participating in an operation depending on the variability of the situation in a battlefield. The network terminal 100 may include an electronic device capable of sending and receiving data to and from the network channel status determining apparatus 200, and it should be noted that the network terminal 100 may include any electronic device capable of performing such an operation.

Meanwhile, the network channel status determining apparatus 200 may be implemented by one or more computing devices. For example, all functions of the network channel status determining apparatus 200 may be implemented by a single computing device. As another example, a first function of the network channel status determining apparatus 200 may be implemented by a first computing device, and a second function thereof may be implemented by a second computing device. Here, the computing device may be, but not limited to, a notebook, a desktop, a laptop, etc., and may include all types of devices equipped with a computing function. However, the network channel status determining apparatus 200 may be implemented by a high-performance, server-grade computing device. An example of the computing device will be described with reference to FIG. 5.

An additional function that can be implemented by the network channel status determining apparatus 200 may be implemented by using an electronic device mounted on the network terminal 100. Hence, although FIG. 1 illustrates the network channel status determining apparatus 200 and the network terminal 100 separately, it is natural that, according to an embodiment, the network channel status determining apparatus 200 may be mounted on the network terminal 100, allowing the corresponding apparatus in the network terminal 100 to implement a first function, a second function, etc. Thus, the present disclosure should not be understood as being limited to the embodiment in which the network terminal 100 and the network channel status determining apparatus 200 are externally separated from each other as depicted in FIG. 1.

In the present specification, for convenience of explanation, a description will be given of a situation in which the network terminal 100 and the network channel status determining apparatus 200 implement functions separately from each other.

In some embodiments, the components included in an environment to which the network terminal 100 and the network channel status determining apparatus 200 are applied may communicate via a network. The network may be implemented as all types of wired/wireless or satellite networks such as a local area network (LAN), a wide area network (WAN), a mobile radio communication network, and WiBro (wireless broadband Internet).

Meanwhile, although the environment depicted in FIG. 1 illustrates that the network terminal 100 and the network channel status determining apparatus 200 are connected via a network, the scope of the present disclosure is not limited thereto, and it should be noted that the network terminal 100 may be connected to the network channel status determining apparatus 200 by P2P (peer-to-peer).

So far, an exemplary environment to which the corresponding apparatus 200 according to some embodiments of the present disclosure is applicable has been described with reference to FIG. 1. In what follows, methods according to various embodiments of the present disclosure will be described in detail with reference to FIG. 2 and the subsequent figures.

Each step of the methods described below may be performed by a computing device. In other words, each step of the methods may be implemented by one or more instructions executed by a processor of a computing device. All steps included in these methods may be performed by a single physical computing device, but the first steps of the methods may be performed by a first computing device and the second steps of the methods may be performed by a second computing device.

Hereinafter, in FIG. 2, the descriptions will be continued assuming that each step of the methods is performed by the network channel status determining apparatus 200 illustrated in FIG. 1. However, for convenience of description, the description of an operating entity of each step included in the methods will be omitted.

Figure 2:
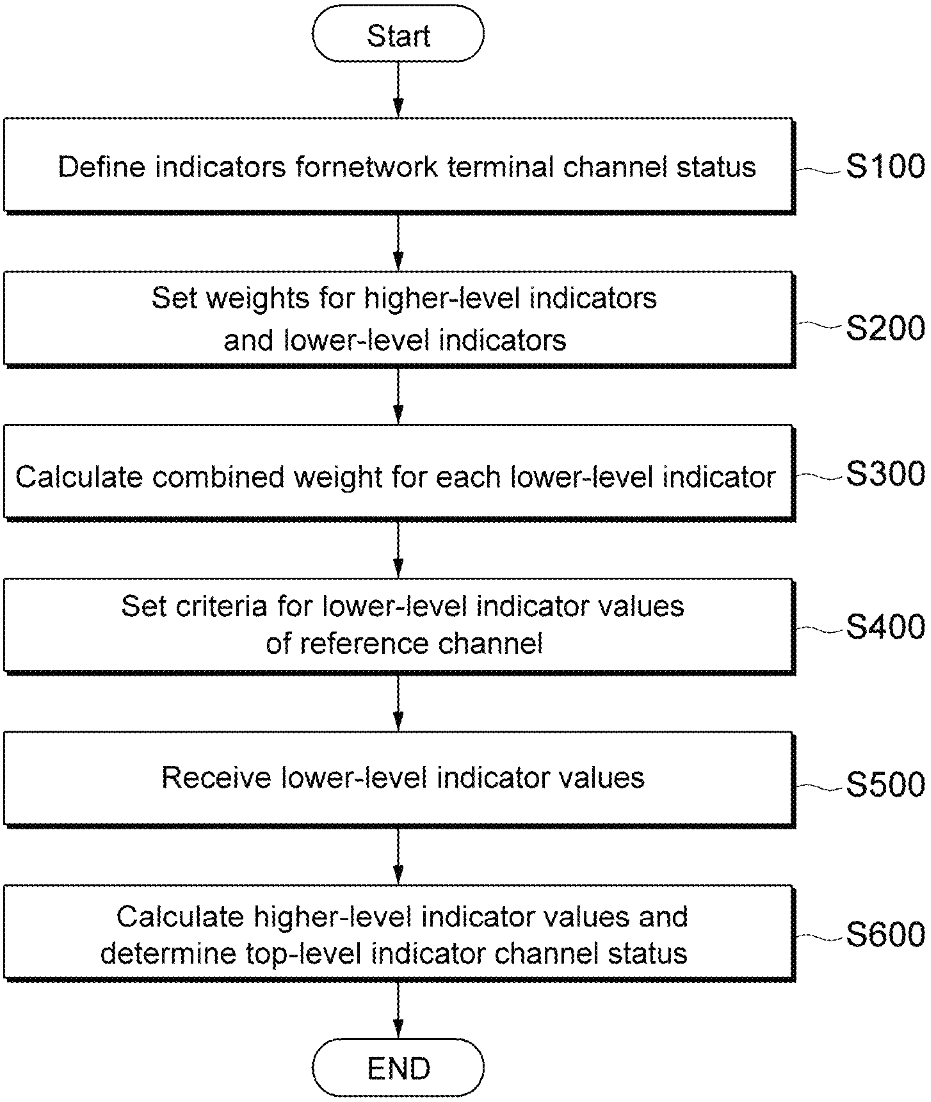
FIG. 2 is a flowchart of an operation in which channel status indicators of a tactical data link are automatically brought together and automatically determined as one channel status, performed by a network channel status determining apparatus according to some embodiments of the present disclosure.

FIG. 2 is a flowchart of an operation in which channel status indicators of a tactical data link are automatically brought together and automatically determined as one channel status, performed by a network channel status determining apparatus according to some embodiments of the present disclosure.

In Step S100, the network channel status determining apparatus 200 may define indicators for channel status. The network channel status indicators mean indicators for measuring network status and performance. The network channel status determining apparatus 200 analyzes network channel status indicators collected according to a designed network architecture and determines the status of the network from the analyzed indicators. The network channel status determining apparatus 200 may select three higher-level indicators “node status”, “congestion state”, and “connection quality” in order to derive a channel status indicator which is the top-level indicator, and the selected higher-level indicators may be described as follows.

- Node status indicator: It means node information that may affect network channels. It is an indicator corresponding to a single node. A single node status indicator affects the statuses of all channels connected to a child node.
- Congestion state indicator: A congestion state caused by a network being overrun with too much network traffic may result in significant delay in receiving messages. It is an indicator corresponding to channels connected between nodes. It affects network channels connected between nodes.
- Connection quality indicator: A deterioration in connection quality may lead to message loss on the network or reception of an erroneous message. It is an indicator corresponding to channels connected between nodes. It affects network channels connected between nodes.

In Step S200, the network channel status determining apparatus 200 may set weights for higher-level indicators and lower-level indicators. In step S300, the network channel status determining apparatus 200 may calculate the weight of each lower-level indicator.

This will be described in more detail through Table 1.

TABLE 1

| Top-level indicator | Higher-level indicators: Indicator name | Weight | Lower-level indicators: Indicator name | Weight | Combined weight |
|---|---|---|---|---|---|
| Channel status | Node status | 0.2 | C2/NonC2 | 0.3 | 0.06 |
| | | | Number of Controlling Units in C2 | 0.5 | 0.1 |
| | | | Number of nodes connected to channels | 0.2 | 0.04 |
| | Congestion state | 0.5 | Channel utilization | 0.5 | 0.25 |
| | | | Amount left in transmission queue | 0.3 | 0.15 |
| | | | Transmission success rate | 0.2 | 0.1 |
| | Connection quality | 0.3 | Quality of connection between two nodes | 0.5 | 0.15 |
| | | | Round-trip time for message transmission and reception | 0.2 | 0.06 |
| | | | Reception delay time | 0.3 | 0.09 |
| | | | Total | | 1 |

In the present disclosure, TOPSIS is one of the major multicriterion decision-making methods, in which a positive solution and a negative solution are obtained. The positive and negative solutions for each alternative are obtained, and a TOPSIS value is obtained by using the positive and negative solutions. The larger the value, the closer the alternative is to the positive solution and at the same time the more distant the alternative is from the negative solution. In TOPSIS, the TOPSIS value is automatically calculated when the lower-level indicator values are quantitative, which satisfies the first and second requirements. However, when there is only one alternative, this alternative alone is ranked first, which violates the third requirement, and therefore the alternative cannot be a solution method to the problem. The TOPSIS method requires two or more alternatives because it uses relative measurements. When intending to learn about the status of a current channel, TOPSIS cannot be applied if there is nothing to compare with. In the present disclosure, channel status is classified into four categories ("Good", "Fair", "Poor", and "Bad"). Four reference channel statuses representing the four categories are referred to as "Good reference channel", "Fair reference channel", "Poor reference channel", and "Bad reference channel". Criteria for the lower-level indicator values that determine each reference channel can be determined by gathering opinions from experts, and the values thus determined are stored within the system without further changes. The procedure explained hitherto is executed only once and is not altered afterwards. In such cases, the four reference channels always exist, and therefore the TOPSIS method can be applied even when only one channel whose status is unknown is inputted. Upon receiving multiple lower-level indicator values for the current channel, the "system" calculates top-level indicator values for the five channels (four reference channels and current channel) by using the TOPSIS method. A reference channel with the smallest difference from the channel status indicator value of the current channel is derived from the channel status indicator values of the reference channels. As a result, upon receiving multiple lower-level indicator values, the internal system performs calculation and presents the status of the current channel as one of "Good", "Fair", "Poor", and "Bad". In this way, the status of the current channel is automatically determined from the lower-level indicator values without intervention from the network manager. In what follows, an exemplary method for determining the channel status of a tactical data link will be described in detail with reference to FIG. 3.

Figure 3:
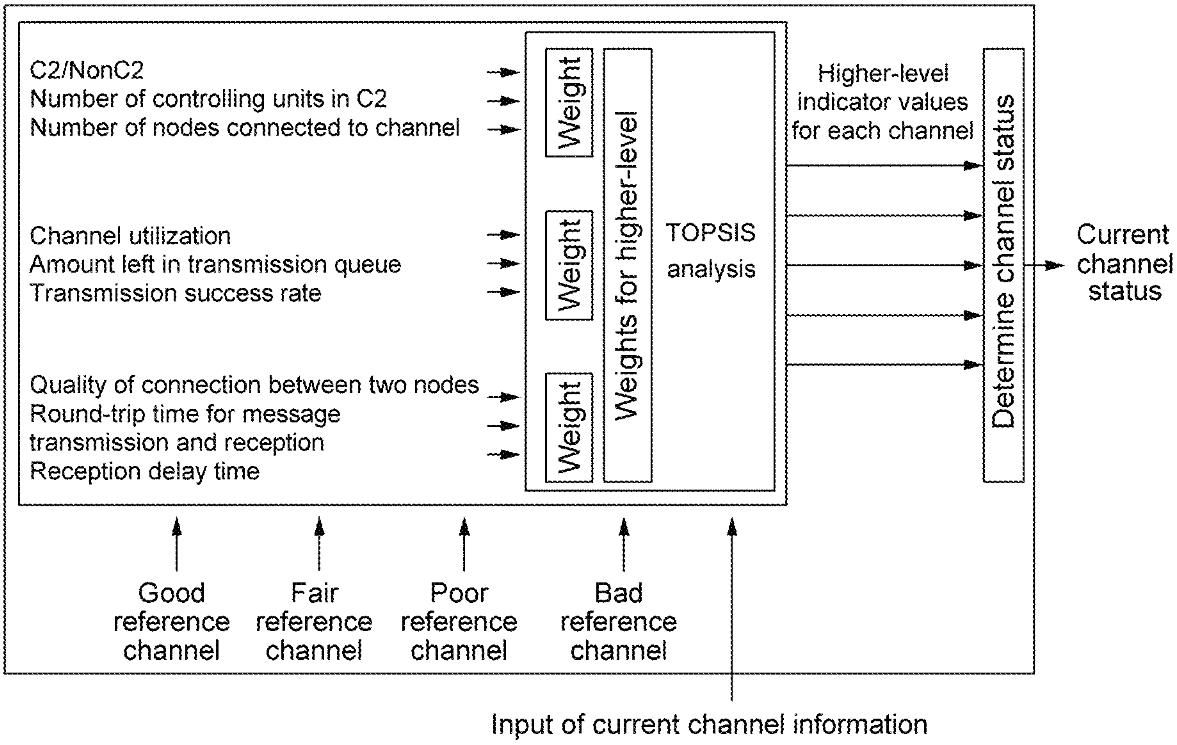
FIG. 3 is an illustration of a method for determining the channel status of a tactical data link according to some embodiments of the present disclosure.

FIG. 3 is an illustration of a method for determining the channel status of a tactical data link according to some embodiments of the present disclosure. Here, although FIG. 3 gives a detailed description of the statuses of the reference channels and the weights, these specific channel statuses and weights are merely an example and should not be construed as limiting.

The network channel status determining apparatus 200 may set criteria for lower-level indicator values of a reference channel, the network channel status determining apparatus 200 may receive the lower-level indicator values, and the network channel status determining apparatus 200 may calculate higher-level indicator values and determine top-level indicator channel status.

Referring back to FIG. 2, more specifically, in Step S400, the network channel status determining apparatus 200 may set criteria for lower-level indicator values of a reference channel. In Step 500, the network channel status determining apparatus 200 may receive the lower-level indicator values. In Step 600, the network channel status determining apparatus 200 may calculate higher-level indicator values and determine top-level indicator channel status. In what follows, an illustrated method of presentation will be described in detail with reference to FIG. 4.

Figure 4:
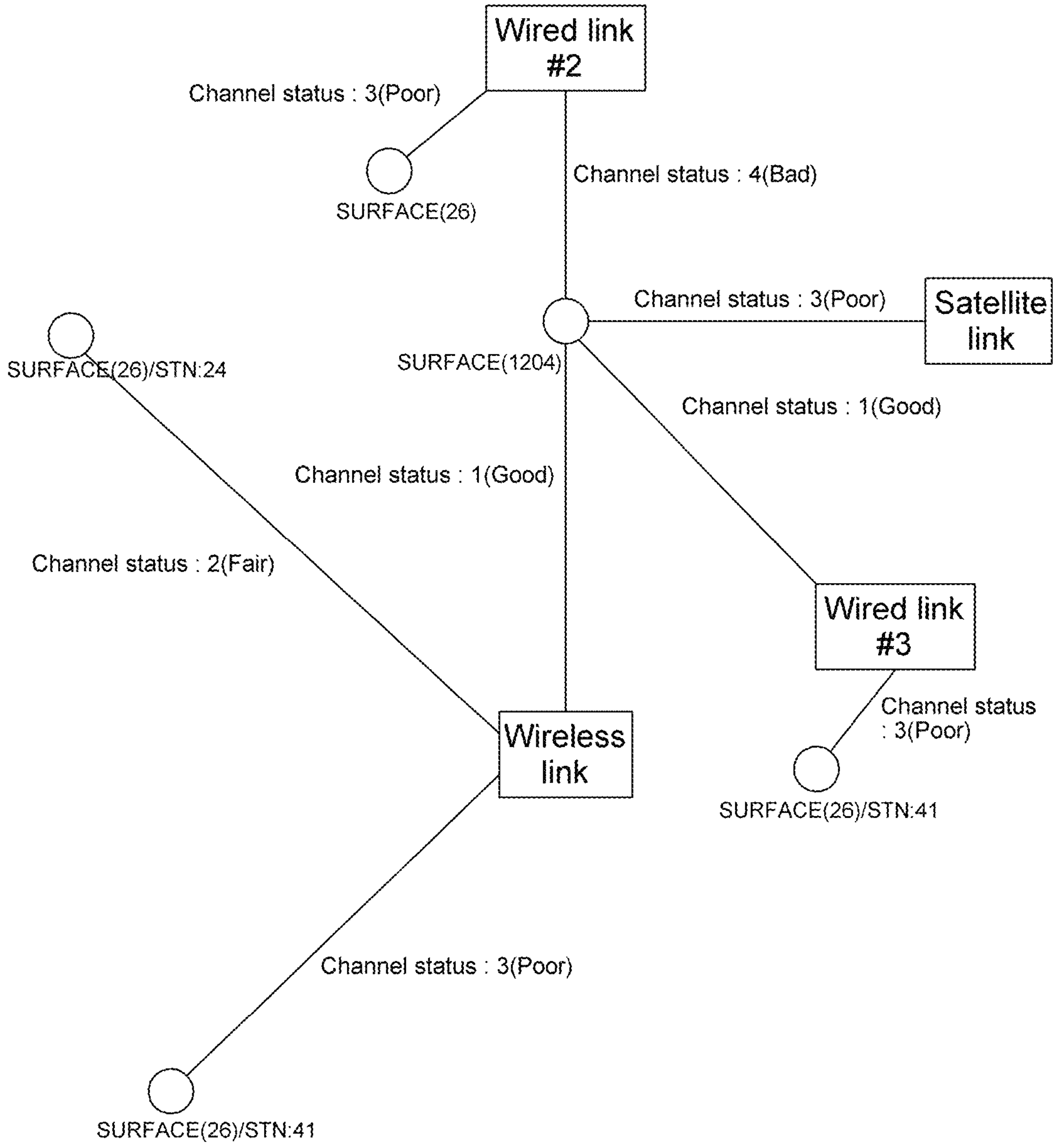
FIG. 4 is an illustration of a method of presenting a top-level indicator of a tactical data link according to some embodiments of the present disclosure.

FIG. 4 is an illustration of a method of presenting a top-level indicator of a tactical data link according to some embodiments of the present disclosure. In the present disclosure, various channel properties of a tactical data link network may be brought together to indicate channel status in real time without intervention from a network manager, and therefore, it is possible to promptly address tactical data link network issues such as channel congestion, deterioration in connection quality, etc. from network structure changes caused by physical and spatial variability of the situation in a battlefield. This allows for stable network operation by promptly coping with variable battlefield situations.

Referring to FIG. 4, each channel's status is displayed, and network channel status can be seen in a more visible manner.

Hereinafter, an exemplary computing device by which the network channel status determining apparatus 200 can be implemented will be described in detail with reference to FIG. 5.

Figure 5:
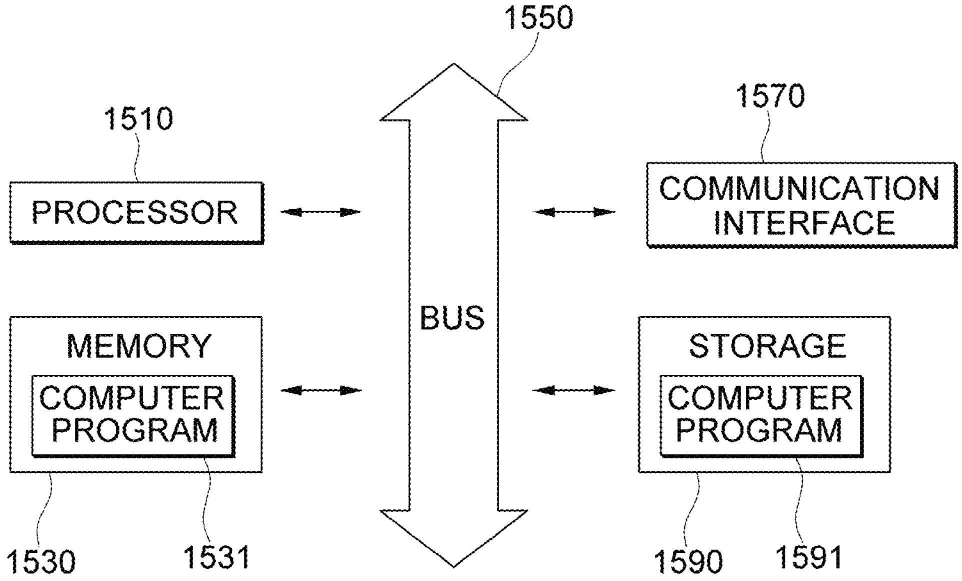
FIG. 5 is an exemplary view of a computing device capable of implementing an apparatus and/or system according to various embodiments of the present disclosure.

FIG. 5 is an exemplary view of a computing device capable of implementing an apparatus and/or system according to various embodiments of the present disclosure.

A computing device 1500 may include one or more processors 1510, a bus 1550, a communication interface 1570, a memory 1530 that loads a computer program 1591 executed by the processor 1510, and a storage 1590 storing the computer program 1591. Incidentally, FIG. 5 only depicts components related to an embodiment of the present disclosure. Accordingly, those of ordinary skill in the art to which the present disclosure pertains may know that other general-purpose components may be further included in addition to the components shown in FIG. 5.

The processor 1510 controls the overall operation of each component of the computing device 1500. The processor 1510 may include a central processing unit (CPU), a microprocessor unit (MPU), a microcontroller unit (MCU), a graphics processing unit (GPU), or any type of processor well known in the art of the present disclosure. Further, the processor 1510 may perform an operation for at least one application or program for executing methods according to the embodiments of the present disclosure. The computing device 1500 may include one or more processors.

The memory 1530 stores various data, instructions and/or information. The memory 1530 may load one or more programs 1591 from the storage 1590 to execute methods according to embodiments of the present disclosure. The memory 1530 may be implemented as a volatile memory such as RAM, but the technical scope of the present disclosure is not limited thereto.

The bus 1550 provides a communication function between the components of the computing device 1500. The bus 1550 may be implemented as various types of buses such as an address bus, a data bus, and a control bus.

The communication interface 1570 supports wired and wireless Internet communication of the computing device 1500. Further, the communication interface 1570 may support various communication methods other than Internet communication. To this end, the communication interface 1570 may include a communication module well known in the art of the present disclosure.

According to some embodiments, the communication interface 1570 may be omitted.

The storage 1590 may non-temporarily store the one or more programs 1591 and various data.

The storage 1590 may include a non-volatile memory such as read only memory (ROM), erasable programmable ROM (EPROM), electrically erasable programmable ROM (EEPROM), flash memory, etc., a hard disk, a removable disk, or any type of computer-readable recording medium well known in the technical field to which the present disclosure pertains.

The computer program 1591 may include one or more instructions causing the processor 1510 to perform methods/operations according to various embodiments of the present disclosure when the computer program 1510 is loaded onto the memory 1530. That is, the processor 1510 may perform methods according to various embodiments of the present disclosure by executing the one or more instructions.

So far, a variety of embodiments of the present disclosure and the effects according to the embodiments have been described with reference to FIGS. 1 to 5. The effects according to the technical idea of the present disclosure are not limited to the effects mentioned above, and other effects not mentioned would be clearly understood by those skilled in the art from the description of the present specification.

The technical idea of the present disclosure described with reference to FIGS. 1 to 5 so far may be implemented as computer-readable codes on a computer-readable medium. The computer-readable recording medium may be, for example, a portable recording medium (CD, DVD, Blu-ray disc, USB storage device, portable hard disk) or a fixed recording medium (ROM, RAM, a computer's built-in hard disk). The computer program recorded on the computer-readable recording medium may be transmitted to another computing device through a network such as the Internet and installed in the other computing device, thereby being used in the other computing device.

In the above, even though all the components constituting the embodiments of the present disclosure have been described as being combined as one or operating in combination, the technical idea of the present disclosure is not necessarily limited to these embodiments. That is, within the scope of the present disclosure, one or more of the components may be selectively combined to operate.

Although the drawings show operations described in a specific order, it should not be understood that the operations are to be performed in the shown specific order or sequential order, or that all shown operations should be performed to obtain a desired result. In certain circumstances, multitasking and parallel processing may be advantageous. Moreover, the separation of the various components in the embodiments described above should not be understood as requiring such separation, and it should be understood that the described program components and systems may generally be integrated together into a single software product or packaged into multiple software products.

Although the embodiments of the present disclosure have been described with reference to the accompanying drawings, those skilled in the art to which the present disclosure pertains may understand that the present disclosure may be implemented in other specific forms without changing the technical idea or essential features of the present disclosure. Therefore, the embodiments described above should be understood as illustrative in all respects and not limiting. The protection scope of the 10 present disclosure should be construed by the following claims, and all technical ideas within the equivalent scope should be construed as being included in the scope of the technical ideas defined by the present disclosure.

What is claimed is:

1. A method for determining a network channel status of a tactical data link using Analytic Hierarchy Process (AHP)-Technique for Order of Preference by Similarity to Ideal Solution (TOPSIS), performed by a network channel status determining apparatus, the method comprising:

defining indicators for network terminal channel status;

setting weights for higher-level indicators and lower-level indicators, out of the indicators;

calculating a combined weight for each lower-level indicator;

setting criteria for lower-level indicator values of a reference channel;

receiving the lower-level indicator values;

calculating higher-level indicator values and determining top-level indicator channel status, wherein the higher-level indicators include node status, congestion state, and connection quality; and managing a network according to the determined top-level indicator channel status.

2. The method of claim 1, wherein the lower-level indicators include channel utilization, amount left in transmission queue, and transmission success rate.

3. The method of claim 2, wherein the lower-level indicators include quality of connection between two nodes, round-trip time for message transmission and reception, and reception delay time.

4. The method of claim 3, wherein the channel status is classified into four categories.

5. The method of claim 4, wherein, upon receiving multiple lower-level indicator values, top-level indicator values for four reference channels and a current channel are calculated by using a TOPSIS method, and a reference channel with the smallest difference from the channel status indicator value of the current channel is derived from the channel status indicator values of the reference channels.

6. An apparatus for determining a network channel status of a tactical data link using Analytic Hierarchy Process (AHP)-Technique for Order of Preference by Similarity to Ideal Solution (TOPSIS), the apparatus comprising:

a processor;

a network interface;

a memory; and a computer program to be loaded onto the memory and executed by the processor, wherein the processor executes the computer program by including:

an instruction that defines indicators for network terminal channel status;

an instruction that sets weights for higher-level indicators and lower-level indicators, out of the indicators;

an instruction that calculates a combined weight for each lower-level indicator;

an instruction that sets criteria for lower-level indicator values of a reference channel;

an instruction that receives the lower-level indicator values;

an instruction that calculates higher-level indicator values and determines top-level indicator channel status, wherein the higher-level indicators include node status, congestion state, and connection quality; and an instruction that manages a network according to the determined top-level indicator channel status.

7. The apparatus of claim 6, wherein the lower-level indicators include channel utilization, amount left in transmission queue, and transmission success rate.

8. The apparatus of claim 7, wherein the lower-level indicators include quality of connection between two nodes, round-trip time for message transmission and reception, and reception delay time.

9. The apparatus of claim 8, wherein the channel status is classified into four categories.

10. The apparatus of claim 9, wherein, upon receiving multiple lower-level indicator values, top-level indicator values for four reference channels and a current channel are calculated by using a TOPSIS method, and a reference channel with the smallest difference from the channel status indicator value of the current channel is derived from the channel status indicator values of the reference channels.

11. A non-transitory computer-readable recording medium with a program recorded therein for a computer to execute the method according to claim 1.

* * * * *